United States Patent [19]

Kawagoe

[11] 3,892,985

[45] July 1, 1975

[54] SET-PREFERRING R-S FLIP-FLOP CIRCUIT

[75] Inventor: Hiroto Kawagoe, Tokyo, Japan

[73] Assignee: Hitachi, Ltd., Japan

[22] Filed: Mar. 11, 1974

[21] Appl. No.: 450,190

[30] Foreign Application Priority Data

Mar. 9, 1973 Japan .............................. 48-27092

[52] U.S. Cl. .............................. 307/279; 307/288

[51] Int. Cl. ..................... H03k 3/286; H03k 3/33

[58] Field of Search .......... 307/205, 214, 238, 279, 307/291, 288; 328/48, 200, 206

[56] References Cited

UNITED STATES PATENTS

| | | | |
|---|---|---|---|
| 3,601,629 | 8/1971 | Cricchi | 307/279 X |
| 3,676,711 | 7/1972 | Ahrons | 307/279 X |
| 3,679,913 | 7/1972 | Foltz | 307/279 |
| 3,753,009 | 8/1973 | Clapper | 307/279 |
| 3,778,782 | 12/1973 | Kitagawa | 307/205 X |

OTHER PUBLICATIONS

Fette, *Dynamic MOS – A Logical Choice*, EDN/EEE (pub.) 11/15/1971; pps. CH6–CH14.

*Primary Examiner*—Michael J. Lynch
*Assistant Examiner*—L. N. Anagnos
*Attorney, Agent, or Firm*—Craig & Antonelli

[57] ABSTRACT

A set-preferring R-S flip-flop circuit comprises a first inverter circuit and a second inverter circuit. The first inverter circuit includes first, third and fifth MISFETs of a first conductivity type channel and second, fourth and sixth MISFETs of a second conductivity type channel. The first and third MISFETs are connected in parallel with each other and are connected between an output terminal of the first inverter circuit and a first power source terminal in series with the fifth MISFET. The sixth MISFET is connected between the output terminal and a second power source terminal, and the second and fourth MISFETs are connected between the output terminal and the second power source terminal in series with each other. The second inverter circuit includes a seventh MISFET of the first conductivity type channel connected between an output terminal of the second inverter circuit and the first power source terminal, and an eighth MISFET of the second conductivity type channel connected between the output terminal and the second power source terminal. An output signal of the first inverter circuit is transferred to input electrodes of the seventh and eighth MISFETs. An output signal of the second inverter circuit is fed back to input electrodes of the first and second MISFETs. A reset signal is applied to input electrodes of the third and fourth MISFETs. A set signal is applied to input electrodes of the fifth and sixth MISFETs.

10 Claims, 10 Drawing Figures

FIG. 1 PRIOR ART
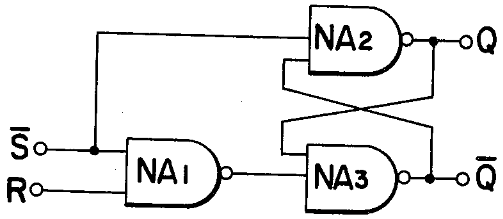
FIG. 2a PRIOR ART
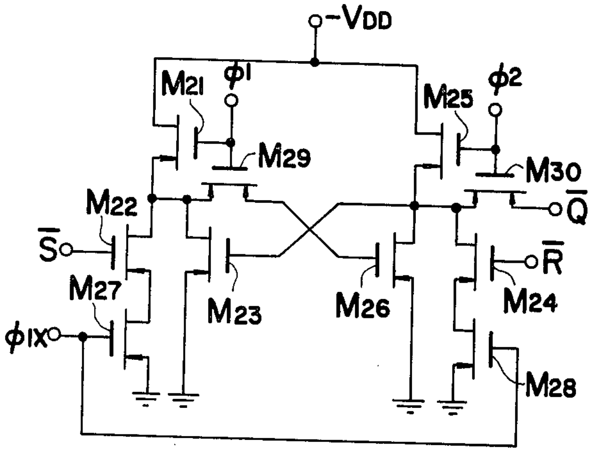
FIG. 2b
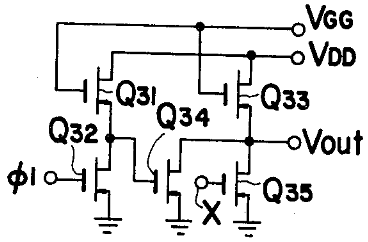
FIG. 2c
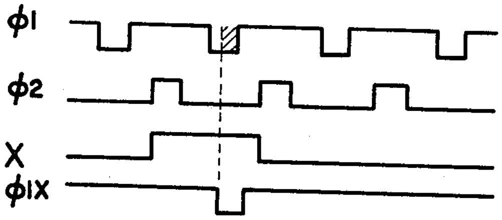
FIG. 3
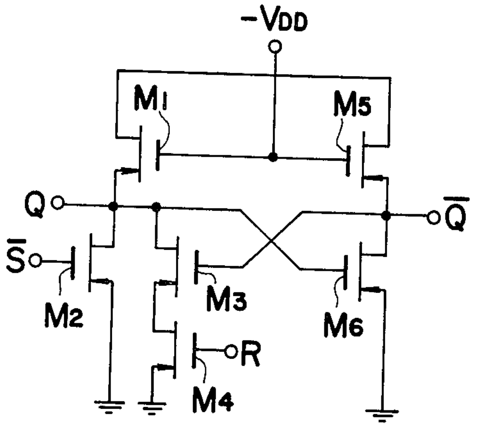
FIG. 4
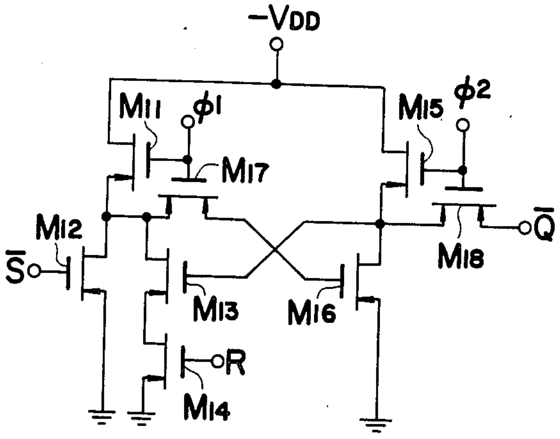
FIG. 5
| S | $\overline{S}$ | R | $\overline{Q_{n+1}}$ | $Q_{n+1}$ |
|---|---|---|---|---|
| 0 | 1 | 0 | $\overline{Q_n}$ | $Q_n$ |
| 0 | 1 | 1 | 1 | 0 |
| 1 | 0 | 0 | 0 | 1 |
| 1 | 0 | 1 | 0 | 1 |

SET-PREFERRING R-S FLIP-FLOP CIRCUIT

This application relates to subject matter described in my co-pending U.S. Pat. application Ser. No. 435,443 entitled "Set Preferring R-S Flip-Flop Circuit," filed on Jan. 22, 1974.

BACKGROUND OF THE INVENTION

The present invention relates to a flip-flop circuit and, more particularly, to a set-preferring R-S flip-flop circuit which is constructed of insulated gate field-effect transistors (MISFETs, which will hereinbelow be simply termed transistors) in a complementary circuit.

An R-S flip-flop circuit is a flip-flop circuit which has the logical function that when its set input S is "1" and a reset input R is "0", the output "Q" becomes "1". When S = "0" and R = "1", the output Q = "0". When S = R = "0", the previous state is stored, and since, with this circuit, its state cannot be determined at S = R = "1", such an input condition is prohibited.

In contrast thereto, a set-preferring R-S flip-flop circuit (hereinafter termed R-S-S flip-flop circuit) has a different logical function from that of the R-S flip-flop circuit in that for S = R = "1", the set input S is preferred, to render the output Q as a "1". The R-S-S flip-flop circuit is, accordingly, suitable for a circuit in which both the set input S and the reset input R can become "1" and the set input S is preferred in that case.

DESCRIPTION OF THE PRIOR ART

Examples of this R-S-S flip-flop circuit are shown in FIGS. 1 and 2.

FIG. 1 illustrates the R-S-S flip-flop circuit of the pure static type, which is composed of three 2-input NAND gates.

The number of transistors employed herein is nine because three transistors are required for a single 2-input NAND gate.

On the other hand, in the quasi-static (delay type) R-S-S flip-flop circuit in FIG. 2*a*, the number of necessary and indispensable transistors is nine ($M_{21}$–$M_{29}$). Where it is necessary to delay the signal by one bit, an additional transistor $M_{30}$ is added, as shown, while it is omitted when a delay of half a bit is desired.

That is, the prior-art R-S-S flip-flop circuit requires nine or more transistors in either type, and a comparatively large number of elements is needed.

Flip-flop circuits of the delay type are required in an electronic calculator and general digital control equipment, and the R-S-S flip-flop circuit in FIG. 2*a*, employed to this end, involves problems to be hereunder described.

A clock control pulse $\phi_{1x}$ is provided by a logical circuit which, as illustrated in FIG. 2*b*, consists of transistors $Q_{31}$–$Q_{35}$ and receives a clock pulse $\phi_1$ and a control signal X as input signals and, hence, the period of time during which the clock pulse $\phi_1$ and the clock control pulse $\phi_{1x}$ overlap, in other words, the period of time during which the transistors $M_{29}$, $M_{27}$ and $M_{29}$, $M_{28}$ in FIG. 2*a* turn "on" simultaneously, during writing, is shorter than the pulse width of the clock pulse $\phi_1$ by the delay component of the logical circuit, as illustrated at an oblique-line part in FIG. 2*c*. The fact that the time of simultaneous conduction of these transistors is short leads to the fact that the period of time in which input signals $\overline{S}$ and $\overline{R}$ are written into the flip-flop circuit is short, and this may become a cause of erroneous operation.

For example, if the simultaneous conduction time of the transistors $M_{29}$ and $M_{27}$ is short, erroneous operation may occur from the relationship among the discharge time constant of a circuit consisting of the transistors $M_{26}$, $M_{29}$, $M_{22}$ and $M_{27}$, the supply voltage $V_{DD}$, a voltage of the gate capacitance of the transistor $M_{26}$ and the threshold voltage $V_{th}$ of the transistor $M_{26}$. If the conduction time of the transistors $M_{28}$ and $M_{29}$ is short, erroneous operation may occur from the relationship among the charging time constant of a circuit consisting of the transistors $M_{21}$, $M_{29}$ and $M_{26}$, the supply voltage $V_{DD}$ and the threshold voltage $V_{th}$ of the transistor $M_{26}$. In particular, the latter case of charging becomes a serious problem because the mutual conductance $g_m$ of the transistor $M_{21}$ is small and, consequently, the time constant is large. In order to make the overlapping time between the clock pulse $\phi_1$ and the clock control pulse $\phi_{1x}$ long, the pulse width of the clock pulse $\phi_1$ may be made sufficiently large, but the clock frequency must be lowered therefor and it becomes inevitable that the speed of a shift register, etc. will be lowered.

Further, since the circuit of FIG. 2*a* uses the clock control pulse $\phi_{1x}$, the circuit for generating it (refer to FIG. 2*b*) is additionally required, and the number of elements is further increased.

In order to solve the foregoing problems, the inventor of the present application has devised single channel R-S-S flip-flop circuits, as shown in FIGS. 3 and 4, which have a small number of elements and in which no erroneous operation arises. These circuits are described in my co-pending U.S. Patent application entitled "Set Preferring R-S Flip-Flop Circuit", Ser. No. 435,443, assigned to the assignee of the present application, and filed on Jan. 22, 1974, and based upon previously filed Japanese application 8685/73, filed in Japan on Jan. 22, 1973.

FIG. 3 shows a purely static R-S-S flip-flop circuit.

In the figure, a load transistor $M_1$ and driving transistors $M_3$, $M_4$ are connected in series and constitute a first inverter circuit (NOR circuit), while load transistors $M_5$ and $M_6$ constitute a second inverter circuit (NOT circuit). The output terminal of the first inverter circuit is connected to the input terminal of the second inverter circuit, namely, the gate electrode of the transistor $M_6$, while the output terminal of the second inverter circuit is fed back to the gate electrode of the transistor $M_3$ as one input terminal of the first inverter circuit. A reset input signal R is applied to the gate electrode of the transistor $M_4$ as is the other input terminal of the first inverter circuit. The first and second inverter circuits thus cross-connected form the basic configuration of the flip-flop circuit.

The driving transistor $M_2$ is an input transistor for the "Set" input, and is connected to the external input terminal of the flip-flop. More specifically, the transistor $M_2$ is connected between the output terminal of the first inverter circuit and a ground terminal, and has the inverted signal $\overline{S}$ of a set input signal S applied to its gate electrode.

Accordingly, the above circuit uses the transistor $M_4$ for reset as a part of the flip-flop circuit, so as to make the construction extremely simple in comparison with the circuits in which, as shown in FIGS. 1 and 2, the gate circuit or transistor for reset is connected to the external input terminal of the flip-flop circuit, and it can reduce the number of necessary and indispensable transistors to six.

FIG. 4 shows a delay type R-S-S flip-flop circuit, which is greatly different from the circuit of FIG. 3 in that a transfer gate transistor $M_{17}$, (a delay means), is connected between the output terminal of the first inverter circuit and the input terminal of the second inverter circuit. Consequently, this circuit differs in operation from the circuit of FIG. 3 in that the output $\overline{Q}$ lags the inputs S and R, and the essential operation is the same as that of the latter circuit.

In accordance with the above circuit, to the advantage that as the clock control pulse $\phi_{1r}$ as shown in FIG. 2 is not used, the number of elements is decreased, there is added the advantage that the problem explained with reference to FIG. 2 can be eliminated.

OBJECTS OF THE INVENTION

In order to reduce the power consumption of the above circuit, the present inventor has further considered to construct it of a complementary circuit.

It is, accordingly, an object of the present invention to make the power consumption of an R-S-S flip-flop circuit low and to diminish the number of elements and, therewith, prevent erroneous operations, previously discussed, from occurring.

BRIEF SUMMARY OF THE INVENTION

The fundamental construction of the present invention for accomplishing the object is characterized by a first inverter circuit which includes first and third MISFETs having a first conductivity type channel and connected in parallel. Second, fourth and sixth MISFETs having a second conductivity type channel as provided, and a fifth MISFET having the first conductivity type channel is connected in series with the first and third MISFETs which are connected in series between an output terminal and a first power source terminal. The sixth MISFET is connected between the output terminal and a second power source terminal, and the second and fourth MISFETs are connected in series therebetween. A second inverter circuit which includes a seventh MISFET having the first conductivity type channel is connected between an output terminal and said first power source terminal. An eighth MISFET having the second conductivity type channel is connected between the output terminal and the second power source terminal. The first and second inverter circuits are cross-coupled so as to transfer an output signal of said first inverter circuit to input electrodes of said seventh and eighth MISFETs and to feed back an output signal of said second inverter circuit to input electrodes of said first and second MISFETs. A Reset signal is applied to input electrodes of said third and fourth MISFETs and a Set signal is applied to input electrodes of said fifth and sixth MISFETs.

The operation of the present invention and further objects of the present invention will become apparent from the following description with reference to the drawings.

BRIEF DESCRIPTION OF THE DRAWINGS

FIG. 1 shows a prior-art, pure static set-preferring R-S flip-flop circuit;

FIG. 2*a* shows a prior-art, quasi-static (delay type) set-preferring R-S flip-flop circuit;

FIG. 2*c* is a waveform diagram of clock pulses used for FIG. 2*a;*

FIG. 2*b* shows a gate circuit for generating a clock control pulse $\phi_{1r}$;

FIGS. 3 and 4 show pure static and quasi-static set-preferring R-S-S flip-flop circuits disclosed in the above-mentioned co-pending application, filed by the applicant of the present application, respectively;

FIG. 5 is a truth table thereof; and

DETAILED DESCRIPTION

Figure 6:
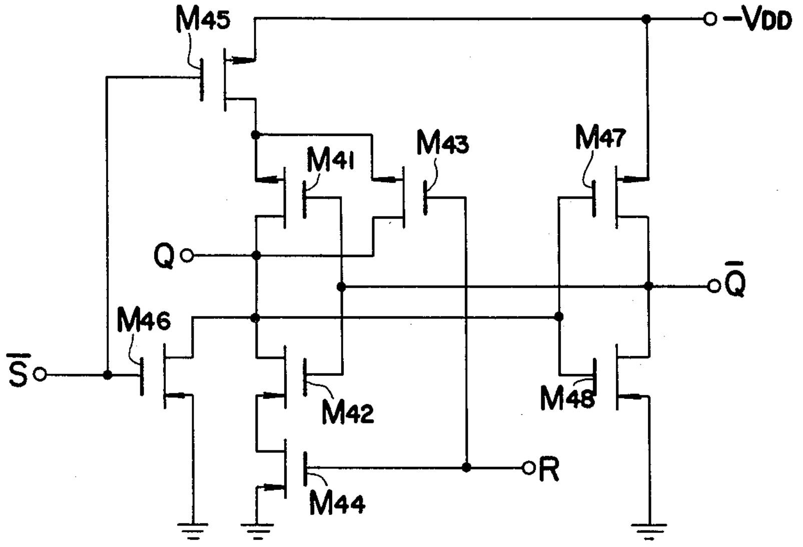
FIGS. 6, 7 and 8 show pure static and quasi-static set-preferring R-S-S flip-flop circuits according to the present invention, respectively.

FIG. 6 shows a complementary type pure static R-S-S flip-flop circuit according to the present invention.

In the figure, n-channel transistors $M_{41}$, $M_{43}$, $M_{45}$ and p-channel transistors $M_{42}$, $M_{44}$, $M_{46}$ constitute a first inverter circuit (OR-AND-NOT circuit) connected in complementary fashion and satisfying the logical expression of $Q=\overline{\overline{S}\cdot(R+\overline{Q})}$, while an n-channel transistor $M_{47}$ and a p-channel transistor $M_{48}$ constitute a second inverter circuit (NOT circuit) connected in complementary fashion. The output terminal of the first inverter circuit is connected to the input terminal of the second inverter circuit; namely, the gate electrodes of the transistor $M_{47}$ and the transistor $M_{48}$, while the output terminal of the second inverter circuit is feedback-connected to the gate electrodes of the transistor $M_{41}$ and the transistor $M_{42}$ as one input terminal of the first inverter circuit.

To the gate electrodes of the transistor $M_{43}$ and the transistor $M_{44}$ as are the other input terminal of the first inverter circuit, a reset input signal R is applied. The first and second inverter circuits thus cross-connected form the basic circuit configuration of the flip-flop circuit.

The transistor $M_{46}$ is an input transistor for the "Set" input, and is connected to the external input terminal of the flip-flop. More specifically, the transistor $M_{46}$ is connected between the output terminal of the first inverter circuit and a ground terminal, and has the inverted signal $\overline{S}$ of a set input signal S applied to its gate electrode.

The operation of the flip-flop circuit thus constructed will now be explained with reference to the truth table in FIG. 5.

Considering first when the set input $\overline{S}$ is "1" (ground potential) and the reset input R is "0", the transistors $M_{43}$, $M_{46}$ are non-conductive and the transistors $M_{44}$, $M_{45}$ are conductive and, hence, the state of the flip-flop does not change and the output $Q_{n+1}$ of the flip-flop circuit at that time is the same as the previous state $Q_n$. In the previous state, only one of the transistor $M_{42}$ and the transistor $M_{41}$ is conductive, and therefore no current flows through the first inverter circuit. Regarding the second inverter circuit, the complementary operation is self-explanatory.

Next, when the set input R also becomes "1", the transistor $M_{43}$ becomes conductive and $M_{44}$ becomes non-conductive, and the transistor $M_{45}$ is now conductive, so that the output of the first inverter circuit, namely, the output Q of the flip-flop becomes "0". At this time, since the transistor $M_{44}$ is non-conductive, information previously stored in the gate capacitances of the transistors $M_{41}$, $M_{42}$ exerts no influence on the output Q, and the information "1" of the output $\overline{Q}$ is written into the gate capacitances. Also, in this state, both transistors $M_{44}$ and $M_{46}$ on the ground side are non-conductive, and no current flows through the first inverter circuit. Only the discharge current of the gate capacitances is caused to flow.

When the set input $\overline{S}$ becomes "0", the transistor $M_{46}$ becomes conductive and, hence, the output Q becomes "1" irrespective of the reset input R (that is, in the set preference). At this time, the transistor $M_{45}$ on the power source side is non-conductive, and the current to flow in the present flip-flop circuit consists only of the discharge current of the gate capacitance of the transistors $M_{47}$, $M_{48}$ and a charging current to the gate capacitances of the transistors $M_{41}$, $M_{42}$ when the previous state is Q = "0".

The foregoing relations become those shown in the table of FIG. 5, and it will be understood that this circuit forms an R-S-S flip-flop circuit into a complementary circuit. In considering these relations, note must be taken of the fact that the inverted signal $\overline{S}$, not the set input S, is applied to the gate electrodes of the transistors $M_{46}$, $M_{45}$.

According to the present embodiment stated above, the number of necessary and indispensable transistors is decreased to eight, and a sharp reduction in the power consumption and a high operation become possible owing to the complementary operation.

Figure 7:
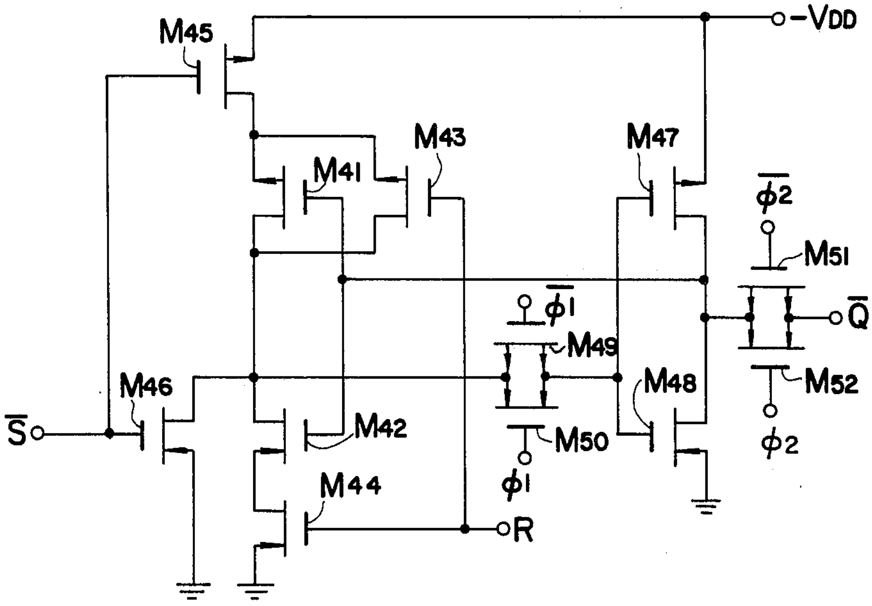

A circuit in FIG. 7 is greatly different from the circuit of FIG. 6 in the point that transfer gate transistors $M_{49}$, $M_{50}$, being delay means according to the present invention, are connected between the output terminal of the first inverter circuit and the input terminal of the second inverter circuit.

Accordingly, the operation of this circuit differs from that of the circuit of FIG. 6 in the point that the output Q lags the inputs S and R, and the essential operation is the same as in the latter circuit.

In the figure, the fact that the p-channel transistor $M_{49}$ and the n-channel transistor $M_{50}$ are connected in parallel as the transfer gate transistors (the same applies to transistors $M_{51}$, $M_{52}$) and that a clock pulse $\overline{\phi}_1$ is applied to the transistor $M_{49}$ and a clock pulse $\phi_1$ to the transistor $M_{50}$, is for the purpose of compensating the transfer level loss due to the substrate effect of the transistors. (Clock pulses $\phi_2$, $\overline{\phi}_2$ are applied to the transistors $M_{51}$, $M_{52}$).

While the present invention has been described above, it can adopt a variety of other modification means without being restricted to the techniques of the embodiments.

For example, the combination between the p-channel transistor and the n-channel transistor may be made between the transistor $M_{41}$ and the transistor $M_{44}$ and between the transistor $M_{43}$ and the transistor $M_{42}$, and the combination of the applications of the reset signal R and the feedback signal of the second inverter circuit may be changed.

Also, a multi-input R-S-S flip-flop circuit can be constructed in such a manner that another transistor can be connected in series or parallel with the transistor $M_{46}$ ($M_{45}$) and is applied with another set input signal, while another transistor is connected in series or parallel with the transistor $M_{44}$ ($M_{43}$) and is applied with another reset input signal. Namely, with reference to FIG. 7, an n-channel MOSFET can be connected in parallel with $M_{46}$, and a p-channel MOSFET connected in series with $M_{45}$. The gates thereof are commonly connected and another set signal is applied to the gates.

A p-channel MOSFET can be connected in series with $M_{44}$ and an n-channel MOSFET connected in parallel with $M_{43}$. The gates thereof are commonly connected and another reset signal is applied to the gates.

Figure 8:
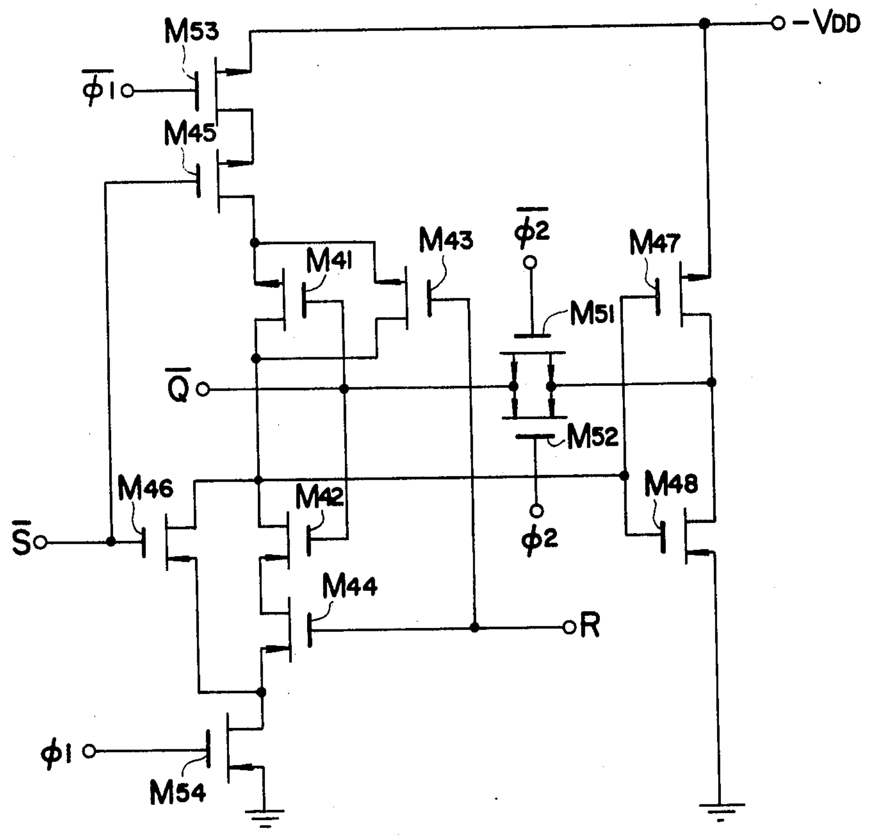

Further, as shown in FIG. 8, the transistors $M_{53}$ and $M_{54}$ are connected in series with the transistors $M_{45}$ and $M_{46}$, respectively instead of the transfer gate transistors $M_{49}$ and $M_{50}$ shown in FIG. 7. With this configuration, the number of contacts for metal layer interconnections can be decreased since, for example a drain region of $M_{53}$ and a source region of $M_{45}$ can be formed in common.

Also, the transfer gate transistors $M_{51}$ and $M_{52}$ may be connected in the feedback path from the second inverter to the first inverter.

It is needless to say that the p-channel transistors and n-channel transistors used in the above embodiments can be replaced by n-channel and p-channel types, respectively.

While I have shown and described several embodiments in accordance with the present invention, it is understood that the same is not limited thereto but is susceptible of numerous changes and modifications as are known to a person skilled in the art, and I therefore, do not wish to be limited to the details shown and described herein but intend to cover all such changes and modifications as are obvious to one of ordinary skill in the art.

What I claim is:

1. A set-preferring R-S flip-flop circuit comprising:

a first inverter circuit which includes first, third and fifth transistors of the same first conductivity type, each having an input electrode, an output electrode and a control electrode, second, fourth and sixth transistors, of the same second conductivity type which is opposite to that of said first, third and fifth transistors, each having an input electrode, an output electrode, and a control electrode, said first and third transistors having their input and output electrodes connected in parallel, said fifth transistor being connected in series with said parallel-connected first and third transistors between a first power source terminal and a first output terminal;

said sixth transistor being connected in series between said first output terminal and a second power source terminal;

said second and fourth transistors being connected in series between said first output terminal and said second power source terminal;

a second inverter circuit which includes a seventh transistor of said first conductivity type and an eighth transistor of said second conductivity type, each having an input electrode, an output electrode, and a control electrode;

said seventh transistor being connected in series between a second output terminal and said first power source terminal;

said eighth transistor being connected in series between said second output terminal and said second power source terminal;

first means for coupling the output of said first inverter circuit to the control electrodes of said seventh and eighth transistors;

second means for feeding-back the output of said second inverter circuit to the control electrodes of said first and second transistors; and third means for applying a reset input signal to the control electrodes of said third and fourth transistors and a set input signal to the control electrodes of said fifth and sixth transistors, so as to make said flip-flop circuit have a function that when said fifth and sixth transistors are respectively non-conductive and conductive, said flip-flop circuit is in a set state irrespective of the reset input signal, and when said fifth and sixth transistors are respectively conductive and non-conductive, said flip-flop circuit remains in the previous state thereof or is in a reset state in accordance with the conductive or nonconductive state of said third and fourth transistors which operate complementarily.

2. A set-preferring R-S flip-flop circuit as defined in claim 1, wherein said first means comprises a delay means, so that the output of said second inverter circuit is delayed with respect to said set and reset signals.

3. A set-preferring R-S flip-flop circuit as defined in claim 2, wherein said delay means comprises a ninth transistor, the conduction of which is controlled by a first clock signal applied thereto.

4. A set-preferring R-S flip-flop circuit as defined in claim 3, wherein said ninth transistor has the first conductivity type and said delay means further comprises a tenth transistor of the second conductivity type which is connected to said ninth transistor in a parallel configuration and the conduction of which is controlled by the inverted signal of said first clock signal.

5. A set preferring R-S flip-flop circuit as defined in claim 4, further comprising an eleventh and a twelfth transistor each having the first and the second conductivity type, respectively, said eleventh transistor being connected in series with said fifth transistor between the first power source terminal and said first output terminal and said twelfth transistor being connected in series with said fourth and sixth transistors between the second power source terminal and said first output terminal, and means for applying a clock signal and its inverted clock signal to said eleventh and twelfth transistors, respectively, so as to control the conduction thereof.

6. In a flip-flop circuit which comprises first, third and fifth transistors of a first conductivity type, each having an input electrode, an output electrode, and a control electrode;

second, fourth and sixth transistors, of a second conductivity type, opposite said first conductivity type, each having an input electrode, an output electrode, and a control electrode;

said first and third transistors having their input and output electrodes connected in parallel;

said fifth transistor having its input and output electrodes connected in series with said parallel connected first and third transistors between a first power source terminal and a first output terminal;

said second and fourth transistors being connected in series between said first output terminal and a second power source terminal;

said sixth transistor having its control electrode connected to the control electrode of said fifth transistor;

a seventh transistor of said first conductivity type and an eighth transistor of said second conductivity type, each having an input electrode, an output electrode, and a control electrode;

said seventh transistor being connected in series between a second output terminal and said first power source terminal;

said eighth transistor being connected in series between said second output terminal and said second power source terminal;

first means for coupling said first output terminal to the control electrodes of said seventh and eighth transistors; and second means for coupling said second output terminal to the control electrodes of said first and second transistors;

the improvement wherein said flip-flop is further interconnected and controlled to operate as a set-preferring R-S flip-flop wherein the input and output electrodes of said sixth transistor are connected to the output electrodes of said first and second transistors and to the input electrode of said fourth transistor, respectively;

a RESET input signal is applied to the control electrodes of said third and fourth transistors, and a SET input signal is applied to the control electrodes of said fifth and sixth transistors;

and wherein, upon said fifth and sixth transistors being rendered respectively non-conductive and conductive, said flip-flop circuit is in the SET state irrespective of said RESET input signal, and upon said fifth and sixth transistors being rendered respectively conductive and non-conductive, said flip-flop circuit remains in its previous state or is reset in accordance with the conductive or non-conductive state of said third and fourth transistors which operate complementarily.

7. The improvement according to claim 6, wherein said first means includes a delay circuit, so that the output at said second output terminal is delayed with respect to said SET and RESET signals.

8. The improvement according to claim 7, wherein said delay circuit comprises a ninth transistor, the conduction of which is controlled by a first clock signal applied thereto.

9. The improvement according to claim 8, wherein said ninth transistor is of the first conductivity type and said delay circuit further comprises a tenth transistor of the second conductivity type, connected to said ninth transistor in a parallel configuration, the conduction of said tenth transistor being controlled by the inverted signal of said first clock signal.

10. The improvement according to claim 9, further including an eleventh transistor of the first conductivity type and a twelfth transistor of the second conductivity type, said eleventh transistor being connected in series with said fifth transistor between the first power source terminal and said first output terminal, and said twelfth transistor being connected in series with said fourth and sixth transistors between said second power source terminal and said first output terminal, and means for applying a clock signal and its inverted clock signal into said eleventh and twelfth transistors, respectively, so as to control the conduction thereof.

* * * * *